No. 635,183. Patented Oct. 17, 1899.
T. E. PIPER.
THILL COUPLING.
(Application filed June 21, 1899.)
(No Model.)
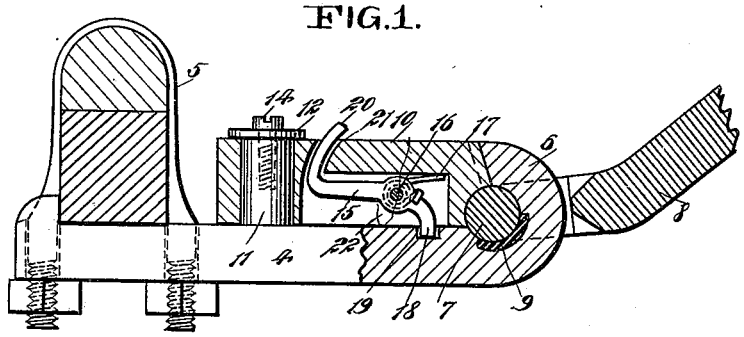
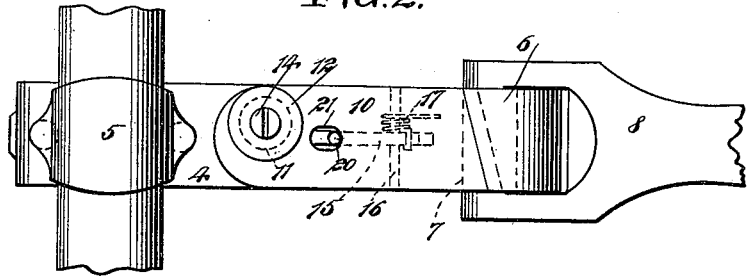
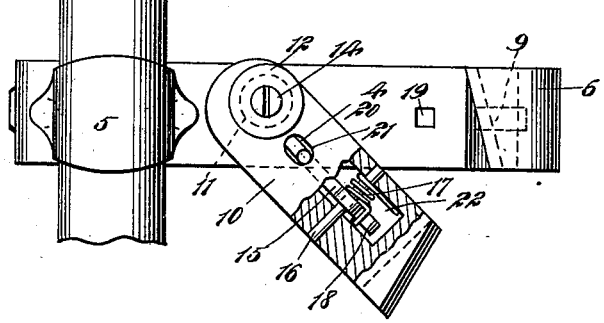
WITNESSES:
INVENTOR
Thomas E. Piper
BY
ATTORNEYS.

UNITED STATES PATENT OFFICE.

THOMAS E. PIPER, OF BLAIRSVILLE, PENNSYLVANIA, ASSIGNOR OF ONE-HALF TO LAWRENCE WINSHEIMER, OF TINCUP, COLORADO.

THILL-COUPLING.

SPECIFICATION forming part of Letters Patent No. 635,183, dated October 17, 1899.

Application filed June 21, 1899. Serial No. 721,322. (No model.)

*To all whom it may concern:*

Be it known that I, THOMAS E. PIPER, of Blairsville, in the county of Indiana and State of Pennsylvania, have invented a new and Improved Thill-Coupling, of which the following is a full, clear, and exact description.

This invention relates to a thill-coupling adapted to provide means for securely holding the thill and at the same time permitting the convenient detachment thereof, the device being designed to overcome the disadvantages resulting from old constructions which render the attachment and detachment of the thills a comparatively lengthy task.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a side elevation of the invention with parts in section. Fig. 2 is a plan view thereof, and Fig. 3 is a similar view with the parts in open position.

The coupling comprises a forwardly-elongated body portion 4, held to the axle by means of a clip 5 and having at its front end an upwardly and rearwardly extended hook 6, the terminal edge of which is disposed diagonally with respect to the body portion, as shown in Figs. 1 and 2. This hook 6 holds the trunnions 7 of the thill 8, and the body portion 4 is provided with a rubber cushion 9, serving to deaden the sound occasioned by the movement of the several parts.

A latch-section 10 is mounted to swing horizontally on the top of the body-section 4 by means of a stud 11, at the top of which is a washer 12, bearing on the latch-section and held by a screw 14. This latch-section has a diagonally-disposed front end adapted to match with the diagonal end of the hook 6, so as to effectually close the hook, as shown in Figs. 1 and 2. The latch-section is held in closed position by means of a dog 15, pivoted on a transverse pin 16 and thrown into normal or closed position by a torsional spring 17, coiled around the pin and bearing against the dog and against the latch-section. The dog 15 has one end bent downward to form a bolt 18, engaging in a recess 19 in the body 4 of the coupling, and the other end of the dog is bent upwardly and forwardly to form a finger-piece 20, extending through a slot 21, formed in the top portion of the latch-section.

The dog is situated within a cavity 22, formed in the latch-section 10. When the latch-section is in closed position, the bolt 18 bears in the recess 19 and holds the latch-section. By pressing down the finger-piece 20 the dog may be thrown to raise the bolt 18 out of the recess 19, thus permitting the swinging of the latch-section and the consequent opening of the coupling.

It will be seen that by means of this construction it is possible to very easily and quickly apply and disengage the coupling and that the coupling when once secured will hold the thill in the most reliable manner.

Having thus described my invention, I claim as new and desire to secure by Letters Patent—

1. A thill-coupling, having a body portion with a hook thereon, the end of the hook being beveled, a latch-section mounted to swing on the body-section and having a beveled end matching with the beveled end of the hook, and a dog acting between the latch and body sections and serving to hold the two sections in locked position.

2. A thill-coupling, having a body-section with a hook thereon, a latch-section mounted to swing on the body-section and serving to close the hook, a pin extended through the latch-section, a dog mounted in a cavity in the latch-section and turning on the pin, and a spring pressing the dog and throwing the same into locked engagement with the body-section, the dog having one end projected upwardly through a slot in the latch-section, such end forming a finger-piece.

3. A thill-coupling, having a body portion with an upwardly and rearwardly projecting hook, a latch-section mounted to swing on the body portion to close the hook and inclose the trunnion of the thill, and a dog located inward of the hook and having a downwardly-extended bolt acting between the latch and body portion to hold the latch in closed position.

THOMAS E. PIPER.

Witnesses:
J. C. BRUNER,
A. H. KOHL.